(12) United States Patent
Köster

(10) Patent No.: US 11,420,691 B2
(45) Date of Patent: Aug. 23, 2022

(54) COUPLING SYSTEM

(71) Applicant: SAF-HOLLAND GmbH, Bessenbach (DE)

(72) Inventor: Mario Sebastian Köster, Podman-Ludwigshafen (DE)

(73) Assignee: SAF-Holland GmbH, Bessenbach (DE)

( * ) Notice: Subject to any disclaimer, the term of this patent is extended or adjusted under 35 U.S.C. 154(b) by 146 days.

(21) Appl. No.: 16/956,346

(22) PCT Filed: Dec. 18, 2018

(86) PCT No.: PCT/EP2018/085399
§ 371 (c)(1),
(2) Date: Jun. 19, 2020

(87) PCT Pub. No.: WO2019/121619
PCT Pub. Date: Jun. 27, 2019

(65) Prior Publication Data
US 2020/0331544 A1 Oct. 22, 2020

(30) Foreign Application Priority Data

Dec. 21, 2017 (DE) .................... 10 2017 130 957.8

(51) Int. Cl.
*B62D 53/08* (2006.01)
*B60D 1/64* (2006.01)
(Continued)

(52) U.S. Cl.
CPC ........... *B62D 53/0842* (2013.01); *B60D 1/64* (2013.01); *B60D 1/015* (2013.01); *B60Y 2200/147* (2013.01); *B62D 53/125* (2013.01)

(58) Field of Classification Search
CPC .. B62D 53/0842; B62D 53/125; B60D 1/015; B60D 1/64
(Continued)

(56) References Cited

U.S. PATENT DOCUMENTS 3,428,334 A 2/1969 Hils
6,709,001 B1 * 3/2004 Morgan .................. B60D 1/62
280/421
(Continued)

FOREIGN PATENT DOCUMENTS

DE 60102393 T2 2/2005
DE 102006059681 A1 6/2008
(Continued)

OTHER PUBLICATIONS

European Patent Office; International Search Report; dated Apr. 3, 2019.

*Primary Examiner* — Kevin Hurley
*Assistant Examiner* — Hosam Shabara
(74) *Attorney, Agent, or Firm* — Price Heneveld LLP

(57) ABSTRACT

A coupling system includes a coupling plug and a coupling receptacle, wherein the coupling plug and the coupling receptacle engage with one another in such a way that the first coupling part makes fluid-tight contact with the first receiving part, the second coupling part makes fluid-tight contact with the second receiving part and the third coupling part makes fluid-tight contact with the third receiving part, and wherein the contact surfaces of the coupling parts and the receiving parts are substantially rotationally symmetrical about the first axis.

16 Claims, 4 Drawing Sheets

(51) Int. Cl.
  *B60D 1/01* (2006.01)
  *B62D 53/12* (2006.01)
(58) Field of Classification Search
  USPC .......................................................... 280/421
  See application file for complete search history.

(56) References Cited

U.S. PATENT DOCUMENTS 10,807,660 B2 * 10/2020 Grossman ............. G05D 1/0225
11,001,317 B2 * 5/2021 Metternich .......... B62D 53/125

FOREIGN PATENT DOCUMENTS

| DE | 202007014589 U1 * | 3/2009 | ........... B62D 53/125 |
| GB | 1020241 | 2/1996 | |
| WO | 0146001 A1 | 6/2001 | |
| WO | 2009080519 A1 | 7/2009 | |

\* cited by examiner

COUPLING SYSTEM

BACKGROUND OF THE INVENTION

The present invention concerns a coupling system, a coupling plug and a coupling receptacle, in particular for use in utility vehicles.

For heavy-duty utility vehicles, it has long been known to use a combination of a fifth wheel coupling and a kingpin to connect a trailer to a towing vehicle. At the same time, especially to supply the trailer with compressed air and electrical energy, flexible lines are laid at various points between the towing vehicle and the trailer, which can also compensate for a pivoting movement of the trailer relative to the towing vehicle. These flexible lines are usually connected by hand by the user of the utility vehicle and wear out continuously during their service life due to the periodic deformations caused by the pivoting movement of the trailer relative to the utility vehicle. So far, no possibility is known for these line systems to combine an automatic coupling process of a towing vehicle to a trailer with the simultaneous connection of pressure lines and electrical lines between the towing vehicle and the trailer.

An object of the present invention is to provide a system which allows the transmission of electrical energy and fluid pressure between a towing vehicle and a trailer in an improved manner. Furthermore, it is an object of the present invention to design this system in such a way that an automatic coupling can be carried out with simultaneous connection of the trailer to the power supply system of the towing vehicle.

SUMMARY OF THE INVENTION

In accordance with the invention, a coupling plug is provided which is designed in particular for use on or in a kingpin, the coupling plug comprising a first coupling part, a second coupling part comprising a third coupling part, wherein the second coupling part is arranged at least partially within the first coupling part and the third coupling part is arranged at least partially within the second coupling part, wherein the coupling parts extend coaxially to a first axis in the area of their overlap, wherein a first pressure chamber is formed between the first coupling part and the second coupling part, wherein a second pressure chamber is formed between the second coupling part and the third coupling part, and wherein the third coupling part is hollow and forms a third pressure chamber, wherein in a first plug area of the coupling plug at least the first and third coupling parts are designed for fluid-tight connection to a fluid pressure system of a trailer, wherein, in a second plug area of the coupling plug, at least the first and third coupling part are designed for connection to a coupling receptacle, wherein the second pressure chamber in the area of the first connection section is closed in a fluid-tight manner or opens into the environment or is connected to a leakage monitor. The coupling plug is designed, advantageously the part of the coupling system being located on the trailer side of the utility vehicle, for the transmission of fluid pressure, more preferably pneumatic air pressure or hydraulic pressure. The plug is also preferably designed for the transmission of electrical energy. For use on and in particular in a kingpin, the coupling plug is predominantly cylindrical on its outside so that it can be inserted into a cylindrical bore in a kingpin. The coupling plug has at least three coupling parts, which are advantageously designed to be essentially hollow cylinders. An essentially hollow-cylindrical design is defined in particular as a predominantly hollow-body geometry which deviates from mathematical rotational symmetry only, for example, in the area of the connection of pressure lines to the respective coupling part and is otherwise rotationally symmetrical about the first axis. The coupling parts are predominantly arranged one inside the other, the first coupling part in the sense of the present invention being the exterior of these coupling parts and the third coupling part being the interior, while the second coupling part is arranged between the first and third coupling parts. Preferably the second coupling part is arranged on at least 85% of its extension along the first axis within the space defined by the first coupling part. Similarly preferably, the third coupling part is arranged within the second coupling part over at least 80% of its length along the first axis. This results in a particularly compact design of the coupling plug and a robust layout can be achieved by using the least possible protruding parts of the coupling plug. Preferably, in addition to the at least one third coupling part, one or a plurality of further third coupling parts may be provided in the sense of the present invention. The third coupling parts can preferably be arranged next to each other within the second coupling part and thus allow a plurality of pressure lines for the connection between trailer and towing vehicle. It is understood that the corresponding number of third receiving parts is provided on the coupling receptacle for connection with the third coupling parts. The first plug area of the coupling connector is preferably the area designed for connecting both electrical lines and fluid pressure lines to the system of the trailer. When the coupling plug is installed on the trailer, the first plug area is preferably located on the top of the trailer. It is advantageous for the first coupling part and the third coupling part in the area of the first plug area to have connecting pins for connecting fluid lines or fluid pipes. The second pressure chamber opens in the area of the first plug area preferably into the environment or is connected to a leakage monitor. In this way, the second pressure chamber can be used in particular to separate the first pressure chamber and the second pressure chamber if a leakage occurs in one of these two pressure chambers and there would therefore be a risk that pressurized fluid could pass from the first pressure chamber to the third pressure chamber or from the third pressure chamber to the first pressure chamber. By placing the second pressure chamber between the first and third pressure chambers and at the same time being designed to dissipate possible leakage pressures, the safety of the coupling plug and a coupling system equipped with this coupling plug can be increased. In the preferred case that a leakage monitor is connected to the second pressure chamber, it may also be signalled to the driver if unexpected pressures are present in the second pressure chamber which are due to a. In a further preferred embodiment, the leakage monitor is designed as a pressure sensor and is located within the second pressure chamber, which is sealed off from the environment. This preferred embodiment means that the second pressure chamber is closed and connected to a leakage monitor. Opposite the first plug area along the first axis, a second plug area is provided on the coupling plug, which is especially designed for connection to a coupling receptacle. In the second plug area, the first and the third pressure chamber are open in order to be plugged into a coupling receptacle and receiving parts present there in such a way that a pressurized fluid can be transferred from the coupling plug into the coupling receptacle and vice versa. For this purpose, preferably sealing elements and/or preferably smoothly polished surfaces are formed on the coupling parts in the area of the second plug area, so that these can be connected as fluid-tight as possible with corresponding receiving parts of a coupling receptacle. In the context of the present invention, it is preferred that the coupling plug and in particular the first coupling part is designed with a fastening geometry for fixing to a kingpin of a trailer. A secure fixing of the coupling plug to the kingpin increases its service life, in particular with respect to the vibrations occurring on the utility vehicle during normal operation. The preferred method of fixing the coupling plug, in particular preferably the first coupling part, is by material bonding, i.e. by means of a welded or glued joint, to or within a kingpin. The second plug area of the coupling plug is preferably the area in which the coupling plug interacts with a coupling receptacle, in particular by overlapping with a coupling receptacle, in order to enable the transmission of fluid pressure and electrical energy in particular.

In a preferred embodiment, the first coupling part is secured against rotation about the first axis relative to the trailer. By fixing at least the first coupling part and in particular preferably the entire coupling plug to the trailer, all the supply and discharge lines to and from the coupling plug which are attached to the trailer can be designed as rigid lines and do not have to perform any pivoting or displacement movements of the coupling plug relative to the trailer and withstand corresponding periodic deformations. In this way, both the wall thicknesses of the respective lines can be reduced and the installation space required for connecting the coupling plug to the trailer system can be significantly reduced and thus optimised. Additionally preferably, the first coupling part supports the second coupling part and/or additionally the third coupling part. Between the second and the third coupling part, a supporting holding geometry is preferably also designed in such a way that the three coupling parts can ultimately be secured against rotation relative to the trailer.

Preferably, at least one of the coupling parts has a sliding contact of an electrical system in the area of the second plug area. The electrical system is preferably equipped with electrical lines and sliding contacts and allows the transmission of electrical voltage from a coupling receptacle fixed on the towing vehicle via sliding contacts to a line system on the coupling plug, which in turn supplies the trailer with electrical energy. Preferably, a sliding contact is provided in or on the wall of at least one of the coupling parts, which is arranged in the area of the second plug area and is designed to be connected to a coupling receptacle in electrical contact with a corresponding recipient.

Preferably the sliding contact is connected to an electrical conductor which is insulated from the respective coupling part and preferably protrudes out of the coupling plug in the first plug area. This embodiment allows several electrical conductors, each with sliding contacts connected to it, to be provided on one of the coupling parts. The disadvantage of this embodiment is that the manufacture of such a coupling part with several sliding contacts and electrical conductors is costly. If two or even only one electrical conductor is sufficient, one of the coupling parts itself can also function as an electrical conductor instead of an electrical conductor, whereby this coupling part can be brought into electrical contact with the corresponding receiving part of a coupling receptacle in each case with a sliding contact, which in the simplest case is the surface of the coupling part. In a more preferred embodiment, both the sliding contacts and the electrical conductors, as well as the respective coupling part are designed with vapour-deposited metal layers. Accordingly, insulating layers or areas are provided between the vapour-deposited metal layer and the material of the respective coupling part, which allow the electrical separation of the individual electrical conductors from each other.

In a preferred embodiment, at least one of the coupling parts is made of electrically non-conductive, in particular preferably non-metallic, material, wherein at least one sliding contact is applied, preferably glued or vapour-deposited, to this at least one coupling part. A resulting advantage of this embodiment is that an additional insulator between the individual electrical conductors and between several electrical conductors and the coupling part to which they are attached is not required. This eliminates the need for an additional layer of insulation and saves installation space, thus achieving a compact design of the plug despite the increased line volume (higher flow rate). A fibre composite material with polypropylene or polyamide as matrix material is particularly preferred as an electrically non-conductive material. For a simplified production of the plug, it is also preferred to manufacture the coupling parts completely from one of the above-mentioned plastics or preferably from PET, which combines maximum strength with good sliding properties and a high electrical insulation capability.

Particularly preferably at least two adjacent coupling parts are made of electrically non-conductive, in particular preferably non-metallic, material, wherein at least one sliding contact is applied, preferably glued or vapour-deposited, to both of these coupling parts. The advantage of areas and parts of the connector which are made of non-conductive material is that these coupling parts are manufactured as one body, whereby, for example, bracing can be provided between the coupling parts. This was not possible until now, because the coupling parts had to be separated by an insulator/separating jacket. Thanks to the design made of electrically non-conductive material, it is no longer necessary to separate the coupling parts themselves and the coupling plug can be designed as a one-piece composite of two or all coupling parts to be much more stable. This makes production more economical and the seals more reliable, for example by using a die-casting process.

Preferably the sliding contact extends with an arc angle of at least 180° about the first axis on the inner or outer wall of the respective coupling part. With an extension of the sliding contact with an arc angle of at least 180° it can be ensured that when the trailer is swivelled by 90° to the left or 90° to the right relative to the towing vehicle, energy can be reliably transmitted to the respective corresponding contact on the coupling receptacle with one and the same sliding contact. At the same time, the end of this contact between the coupling receptacle and in the coupling plug can thus also be used as a warning or trigger signal to warn the driver of the utility vehicle of an excessive swivel angle of the towing vehicle and trailer. In order to permit reliable transmission of electrical energy even in larger swivel ranges of the towing vehicle and trailer, the sliding contact can extend with an arc angle of up to 270° around the first axis on the inner or outer wall of the coupling part. In an alternatively preferred embodiment, the sliding contact or the plurality of sliding contacts extends with an arc angle of up to 360° or, more preferred, exactly 360° around the first axis and/or the second axis. With this preferred embodiment, it is possible to mount the coupling plug or the coupling receptacle equipped with the sliding contacts in any desired installation position, i.e. without a certain twist in the area of a fifth wheel coupling The sliding contact is particularly preferred arranged on the second coupling part. In particular, the sliding contact is preferably located on the inside of the second coupling part. Since the second pressure chamber provided on the inside of the second coupling part is advantageously not designed for the transmission of fluid pressure, but only for the removal of escaping leakage fluids, the electrical power transmission can advantageously take place in this area without interacting with the fluid pressure transmission. In this way, particularly fluid-tight connections between a coupling plug and a coupling receptacle can be formed in the remaining contact areas, while in the area of the second pressure chamber, exclusively or mainly the electrical energy transmission is carried out. Accordingly, the sliding contact can advantageously also be arranged on the outside of the third coupling part. Furthermore, it is preferable to have corresponding sliding contacts and electrical conductors on both the inside of the second coupling part and the outside of the third coupling part in order to provide a large number of lines for the transmission of electrical signals and electrical energy.

Preferably a plurality of electrical sliding contacts is provided on one or a plurality of coupling parts, wherein each of the sliding contacts is connected to an electrical conductor. By arranging a plurality of electrical sliding contacts and electrical conductors, in particular a large data volume of electrical signals can be transmitted to the trailer at the same time or additionally with the corresponding electrical voltage to supply pumps, motors and lighting.

It is advantageous that all the sliding contacts are arranged and fixed on the second coupling part. In this way, in particular the connection geometry of the electrical conductors can be concentrated on the second coupling part, so that advantageously only one plug element has to be plugged onto it, which connects a large number of electrical conductors with the respective sliding contacts arranged on the second coupling part. The individual sliding contacts extend along circumferential paths around the first axis, and are spaced from one another along the first axis. By providing corresponding sliding contacts at the plug receptacle, when the correct position of the plug and the plug receptacle is reached in the fully coupled position along the first axis, one pair of sliding contacts each can transmit electrical energy at the plug and at the receptacle.

In a preferred design, the first coupling part is materially connected to or constructed in one piece with a kingpin. In this way, in particular the installation space required for the coupling plug within the kingpin can be significantly reduced, since the inner wall of the through hole made in a kingpin can already be used as the first coupling part in the sense of the present invention. At the same time, the particularly firm connection between the coupling plug and the kingpin can be achieved.

Furthermore, the second pressure chamber preferably opens into the environment, wherein preferably a protective element is provided at the outlet into the environment. In the present case, preferably a filter element can be used as a protective element, which prevents dirt or undesirable liquids from entering the second pressure chamber. Also, preferably, a grid can also be provided as a protective element, which allows an improved permeability of fluid, but prevents the penetration of dirt particles and solids into the second pressure chamber.

Advantageously, the coupling plug comprises a light signal transmission system, wherein a first light signal transmitter and/or receiver is fixed to at least one of the coupling parts, which is designed to communicate without contact with a second light signal transmitter and/or receiver on a coupling receptacle.

As an alternative or in addition to the electrical power and signal transmission system, the coupling connector preferably has a light signal transmission system. A light signal conductor is therefore advantageously provided on the coupling plug, preferably in the area of the first plug area, which sends or receives light signals to a corresponding light signal transmitter and/or receiver on a coupling receptacle, advantageously through the first pressure chamber, the second pressure chamber or the third pressure chamber. The advantage of a light signal transmission system is that it can function without contact and therefore there is no wear of sliding contacts as with the electrical signal and energy transmission system. The amount of signals that can be transmitted by a light signal transmission system is also much greater than with electrical signals, since several signals can be transmitted simultaneously, especially with different wavelength ranges of electromagnetic radiation. In particular preferably, the first light signal transmitter and/or light signal receiver is arranged within the third coupling part, wherein the first axis intersects this light signal transmitter/receiver and wherein the light signal transmitter/receiver transmits light signals parallel or collinear to the first axis in the direction of a second light signal transmitter/receiver at the coupling receptacle.

Furthermore, in accordance with the invention, a coupling receptacle is provided, in particular for use on or in a fifth wheel coupling, which comprises a first receiving part, a second receiving part and a third receiving part, wherein the second receiving part is arranged at least in regions within the first receiving part and the third receiving part is arranged at least in regions within the second receiving part, wherein the receiving parts extend coaxially to a second axis in the area of their overlap, wherein a first receiving pressure chamber is formed between the first receiving part and the second receiving part, wherein a second receiving pressure chamber is formed between the second receiving part and the third receiving part, and wherein the third receiving part is hollow and forms a third receiving pressure chamber, wherein a first receiving section of the coupling receptacle at least the first and the third receiving part are designed for fluid-tight connection to a fluid pressure system of a utility vehicle, wherein in a second receiving section of the coupling receptacle at least the first and the third receiving part are designed for connection to a coupling plug, wherein the second connection pressure chamber in the area of the first connection section is closed in a fluid-tightply or opens into the environment or is connected to a leakage monitor. The coupling receptacle is preferably the counterpart to the coupling plug on the side of the towing vehicle, and is correspondingly fixed with advantage on a fifth wheel coupling of the vehicle. The features described correspondingly for the first receiving section and the second receiving section of the coupling receptacle are essentially identical to those described for the first and second plug area. The receiving parts, like the coupling parts described above, are essentially hollow cylindrical in shape and are arranged coaxially with a second axis, which is defined in accordance with the first axis, at least in the area of their overlap. Analogous to the design of the second connection pressure chamber as a buffer area between the first and the third connection pressure chamber, this is either sealed fluid-tight, in which case the second pressure chamber of the coupling plug is closed not fluid-tight if possible, or it opens into the environment or is connected to a leakage monitoring system. As already described for the coupling plug, the second pressure chamber can preferably be closed and have an internally arranged pressure sensor which serves as leakage monitor.

It is advantageous that the second receiving pressure chamber is connected to a leakage monitoring system. It is advantageous that the leakage monitoring system is located on the side of the towing vehicle. In this way it can be ensured that in the event of a failure of the electrical system on the trailer, a reliable warning of leakage at the first or third pressure chamber or at the first or third receiving pressure chamber is still given. In the case that the second receiving pressure chamber is connected to a leakage monitoring system, the advantage of the second pressure chamber being sealed fluid-tight at the coupling plug is understandable, so that all leakage fluid in the second pressure chamber or in the second receiving pressure chamber must flow in the direction of the leakage monitor.

Preferably, the coupling receptacle has sliding contacts and electrical conductors analogous to the electrical energy transmission system of the coupling plug, which are designed to transmit electrical signals and electrical energy to or from the electrical system of the coupling plug. The characteristics, in particular the extension of the sliding contacts with a certain arc angle, are essentially analogous to the corresponding, previously described characteristics of the electrical system on the coupling plug. Furthermore, in the coupling receptacle, receiving parts made of electrically non-conductive material with applied sliding contacts are preferred, as already described above for the coupling parts.

Furthermore, according to the invention, a coupling system is provided which comprises a coupling plug, as described above, and a coupling receptacle, as also described above, wherein the coupling plug and the coupling receptacle engage with one another in such a way that the first coupling part makes fluid-tight contact with the first receiving part, the second coupling part makes fluid-tight contact with the second receiving part and the third coupling part makes fluid-tight contact with the third receiving part, wherein the contact surfaces of the coupling parts and the receiving parts are substantially rotationally symmetrical about the first axis.

It is advantageous that the coupling plug and the coupling receptacle can be pushed into each other along a first axis, the first axis and the second axis run collinearly, when pushed together. It is advantageous that the coupling or the coupling process takes place between the coupling plug and the coupling receptacle and thus along the first axis or along the second axis. In practice, this means that the kingpin with the coupling plug attached to it is first inserted into the corresponding receptacle on the fifth wheel coupling, which is usually transverse to the first axis. Then the coupling plug and/or the coupling receptacle can be moved parallel to the first or second axis in order to establish a fluid-tight connection with the other part (coupling plug or coupling receptacle). In this way the coupling system can be brought into a state in which the transmission of fluid pressure, preferably air pressure or hydraulic pressure, and in addition also for the transmission of electrical energy and electrical signals, and preferably additionally or alternatively also for the transmission of light signals.

It is advantageous if either the second pressure chamber or second receiving pressure chamber opens into the environment or is connected to a leakage monitor. In other words, at least one of the two pressure chambers, i.e. the pressure chamber at the coupling plug or the receiving pressure chamber at the coupling receptacle, is thus closed fluid-tight, so that the monitoring of leakage fluid or the removal of leakage fluid only takes place in the other chamber, respectively. It is advantageous if the second receiving pressure chamber below the coupling plate opens into the environment or into a leakage monitoring system. In this way the opening of the second receiving pressure chamber is particularly well shielded against the effects of foreign object from the outside.

BRIEF DESCRIPTION OF THE DRAWINGS

Further advantages and features of the present invention result from the following description with regard to the attached figures. It is understood that individual features, which are represented in only one of the embodiments, can also be used in other embodiments, unless this has been explicitly excluded or is prohibited by technical circumstances. In particular, features such as sliding contacts and electrical conductors, which are only shown for the coupling plug, can of course also be provided on correspondingly preferred embodiments of the coupling receptacle.

It is shown in.

DETAILED DESCRIPTION OF THE PREFERRED EMBODIMENTS

Figure 1:
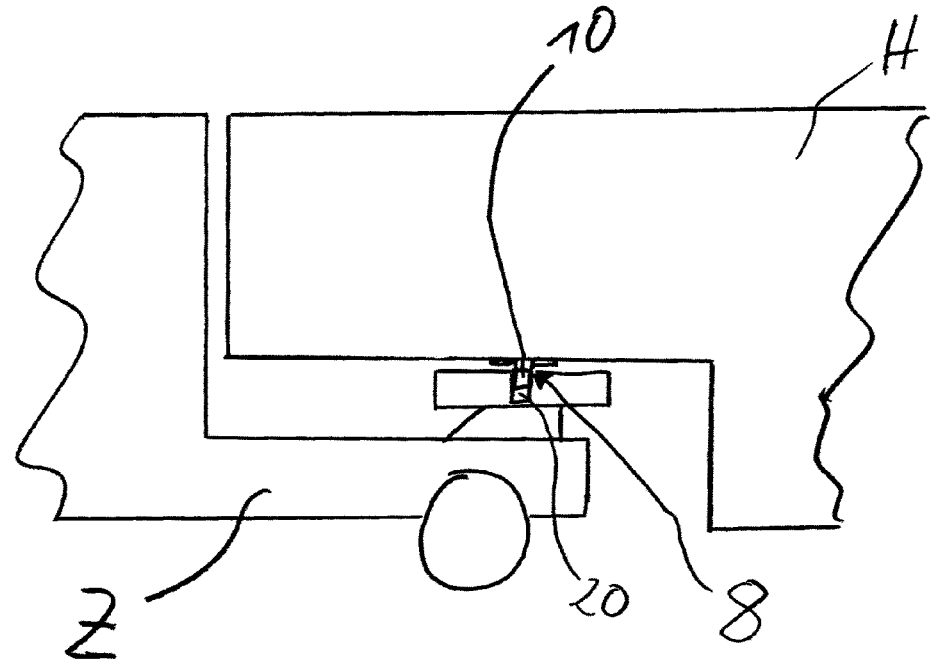
FIG. 1 is a first schematic side elevation view of a utility vehicle equipped with a coupling receptacle in accordance with the invention.

The schematic view of a utility vehicle with a towing vehicle Z and a trailer H shown in FIG. 1 has a fifth wheel coupling with a kingpin 8. A coupling plug 10 is provided in or at least on the kingpin 8. Correspondingly, the fifth wheel coupling of the towing vehicle Z has a coupling receptacle 20. The coupling plug 10 and the coupling receptacle 20 thus define a coupling system according to the present invention. By means of the coupling system it is possible to transmit fluid pressure, in particular pneumatic pressure or hydraulic pressure, and, where applicable, also electrical energy or electrical control signals in the area of the pivot point between the towing vehicle Z and the trailer H. Therefore, it is not necessary to lay further lines or cables between the towing vehicle Z and the trailer H, which have to be deformed and guided and thus wear out when the trailer pivots relative to the towing vehicle. Furthermore, the installation space that would be taken up by these cables is also saved, so that the connection area between the towing vehicle Z and the trailer H is much more compact than is known from the state of the art to date.

Figure 2:
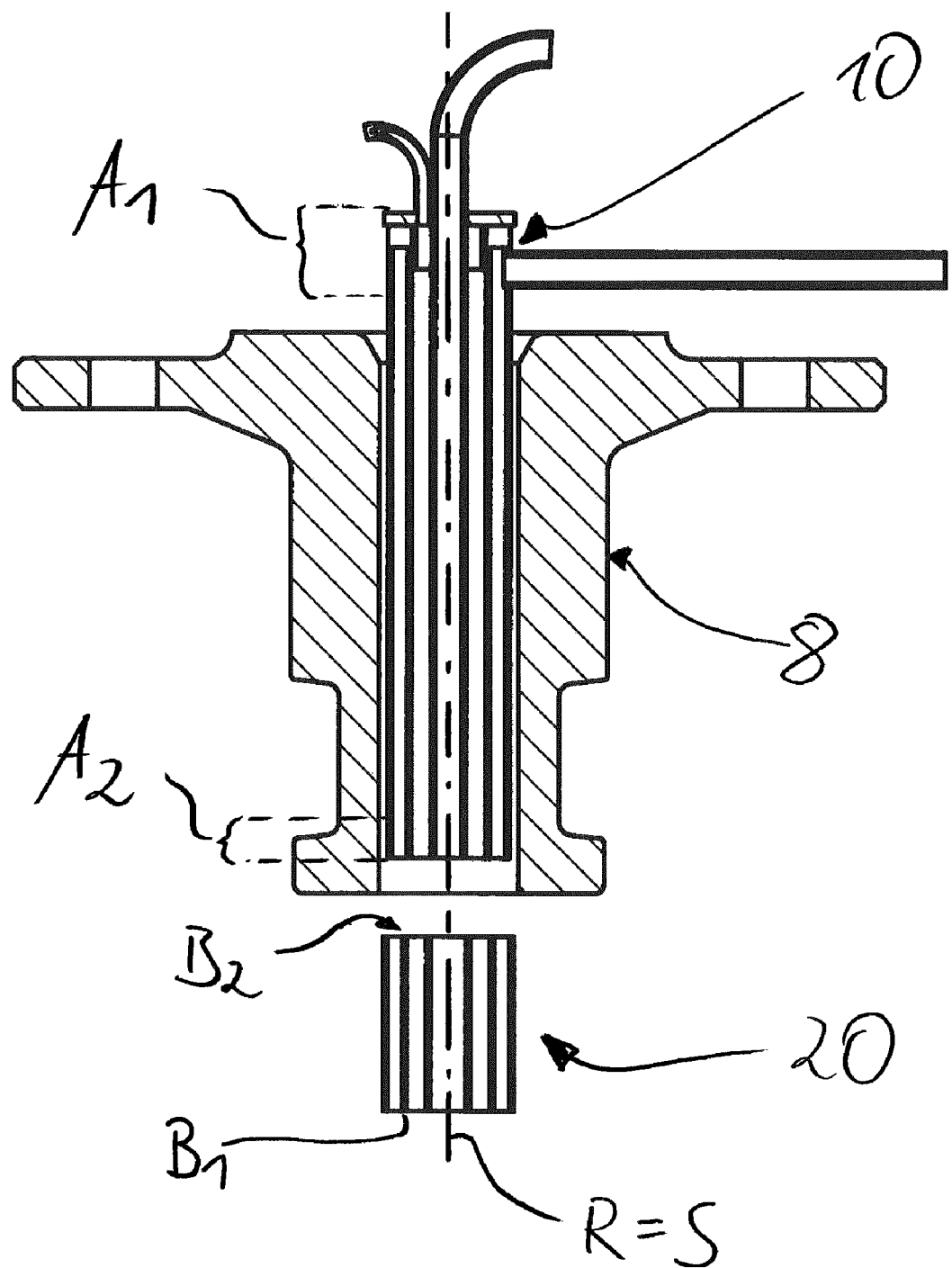
FIG. 2 is a schematic cross-sectional side elevation view of a coupling plug and a coupling receptacle within the meaning of the present invention.

FIG. 2 shows a sectional view of a kingpin 8, in which a coupling plug 10 is inserted. Furthermore, it is shown schematically that on the fifth wheel coupling not shown, a coupling receptacle 20 is arranged in such a way that the first axis R of the coupling plug 10 is collinear with the second axis S of the coupling receptacle 20. In this position relative to one another, in the present case the coupling receptacle 20 can preferably be displaced along the first or second axis R, S in the direction of the coupling plug 10 in order to come into engagement with the second plug area $A_2$ with a second receiving area $B_2$. In particular, the coupling receptacle 20 and the coupling plug 10 overlap each other in the assembled state in such a way that a fluid-tight connection is produced between the individual parts of the coupling plug 10 and the coupling receptacle 20. Furthermore, it is shown that both the coupling receptacle 20 and the coupling plug 10 each have a first area A1 and B1, whereby in this first area the connection of the coupling plug 10 and the coupling receptacle 20 with the line system on the trailer H or the towing vehicle Z can be established.

Figure 3:
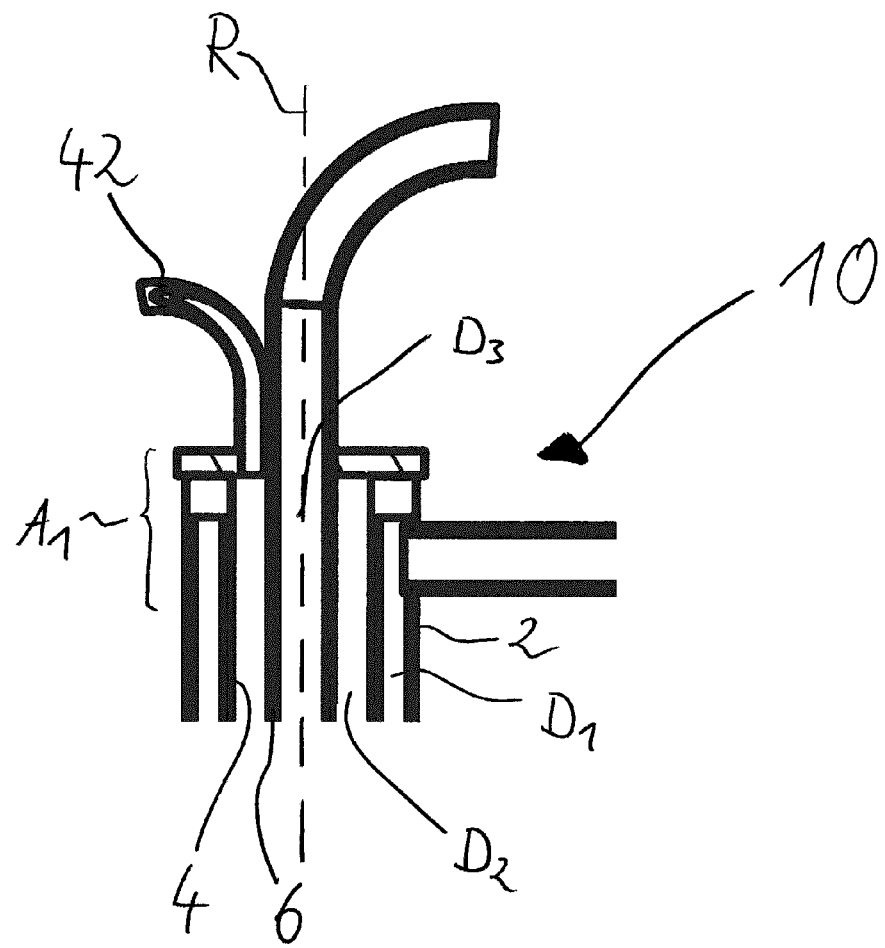
FIG. 3 is a cross-sectional side elevation view of a preferred embodiment of a part of a coupling plug.

FIG. 3 shows a detailed view of the upper area of a coupling plug 10, showing that the first coupling part 2 and the second coupling part 3 border a first pressure chamber $D_1$, and the second coupling part 4 and the third coupling part 6 border a second pressure chamber $D_2$, and the third coupling part 6 encloses a third pressure chamber $D_3$. The first pressure chamber $D_1$ opens into the tube shown schematically and extending horizontally out of the coupling plug 10, which serves to supply or remove fluid pressure. The third pressure chamber $D_3$ opens into the tube attached to the upper side or a corresponding hose, which is also designed for the supply and/or removal of fluid pressure. The second pressure chamber $D_2$ opens into the tube located on the left side of the coupling plug 10, which opens into the environment. A protective element 42 is provided at the outlet area of this curved tube, which is designed in particular as a filter or grid to prevent dirt or corrosive fluids from entering the second pressure chamber $D_2$. All connection geometries for connecting the pressure chambers $D_1$, $D_2$, $D_3$ with the trailer H are essentially located in the area of a first plug area $A_1$, which, in relation to the entire coupling plug 10, is preferably provided on the upper side, i.e. preferably on the side facing towards the trailer H. On the underside of coupling plug 10 not shown in FIG. 3, preferably the second plug area $A_2$ is located, in which the coupling plug 10 can be connected with a coupling receptacle 20 see FIG. 2 and FIG. 1.

Figure 4:
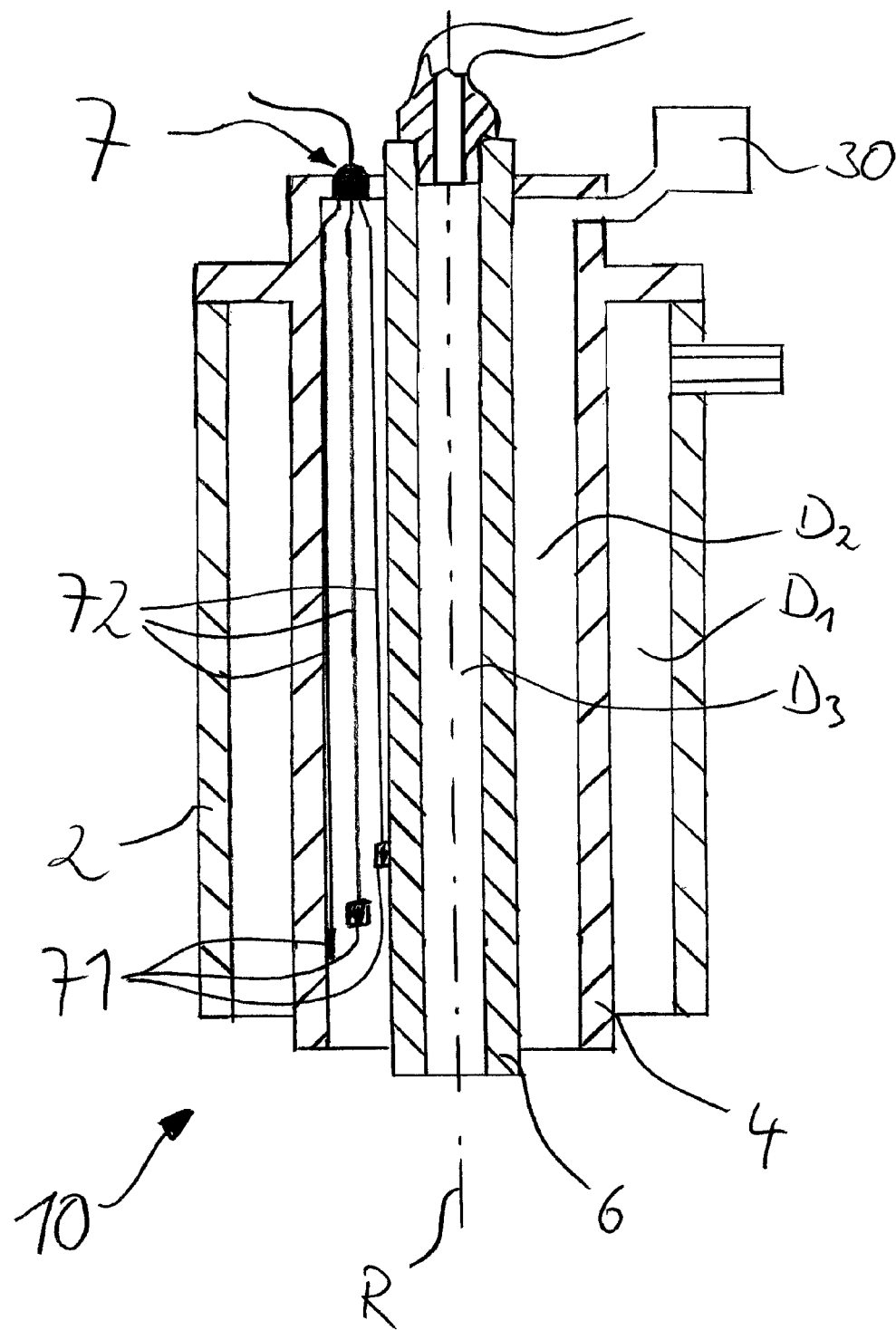
FIG. 4 is a cross-sectional side elevation view of a preferred embodiment of a coupling plug according to the invention.

FIG. 4 shows a cut view of a preferred embodiment of the coupling plug 10 according to the invention. Thereby, in addition to the pressure chambers $D_1$ to $D_3$ described above, a preferably provided electrical system 7 is also arranged on the coupling plug 10. The electrical system 7 preferably has sliding contacts 71 and electrical conductors 72 leading to these sliding contacts 71. In the preferred embodiment shown in FIG. 4 the electrical system is essentially arranged and fixed on the second coupling part 4. However, it is also conceivable that the individual sliding contacts 71 are distributed to different coupling parts 2, 4, 6. In addition, FIG. 4 shows that the second pressure area $D_2$, in contrast to the one in the previous shown embodiments, does not lead into the environment, but into a leakage monitor 30. The leakage monitor 30 can, for example, have a pressure sensor which emits a warning signal to the driver of the utility vehicle when the pressure in the second pressure area $D_2$ increases. The leakage monitor 30 can be located both at the coupling plug 10 and in the correspondingly designed coupling receptacle 20. Preferably, a leakage monitor 30 is provided both in the coupling receptacle 20, which is fixed to the towing vehicle Z, and in the coupling plug 10, which is fixed to the trailer H. It goes without saying that the electrical system 7 shown in FIG. 4 is also correspondingly present on the coupling receptacle 20, which is not shown in this figure, whereby sliding contacts 71 corresponding to the sliding contacts 71 on the coupling plug 10 are also formed on the coupling receptacle 20.

Figure 5:
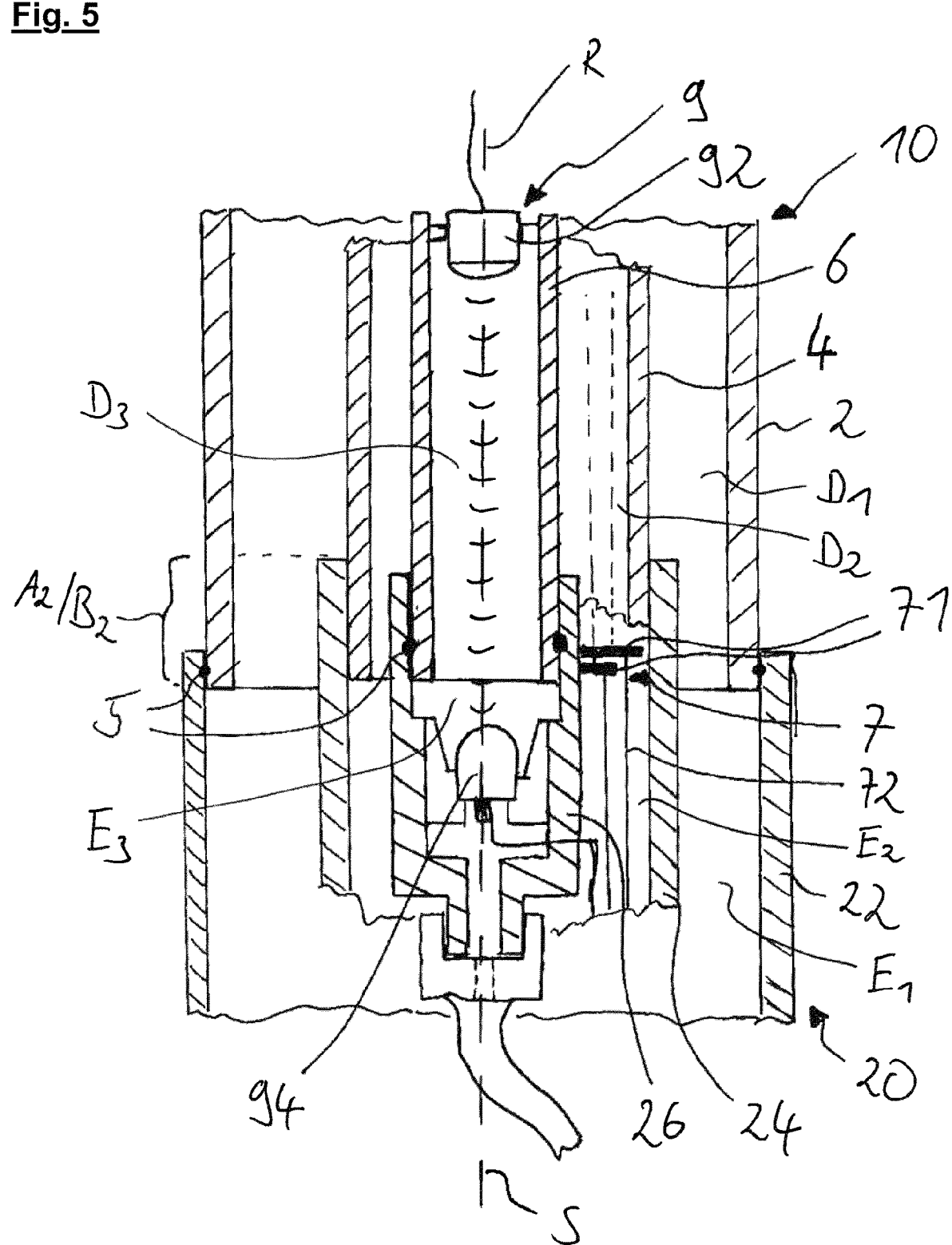
FIG. 5 is a cross-sectional side elevation view of a preferred embodiment of a coupling system according to the present invention.

FIG. 5 shows a coupling system according to the present invention, in which preferably in addition to the electrical system 7 a light signal transmission system 9 is also provided. The light signal transmission system has a first light signal transmitter/receiver 92, which is fixed to the coupling plug 10 and in particular preferably to the third coupling part 6. Correspondingly, a second light signal transmitter/receiver 94 is arranged on the coupling receptacle 20, which communicates with the light signal transmitter/receiver 92 arranged on the coupling plug 10. Light signal transmitters have the advantage that higher data rates can be transmitted with them than with simple electrical, analog lines and that no wear and tear processes due to solid friction, as occurs in the electrical system 7, take place. In addition, FIG. 5 shows the coupling system in a plugged-together state, with the coupling plug 10 and the coupling receptacle 20 being plugged into each other along the first axis R and the second axis S which runs collinearly in this position. For sealing between the first coupling part 2 and the first receiving part 22, at least one seal 5 is provided in their overlap area. Such a seal 5 is also provided in the overlap area between the third coupling part 6 and the third receiving part 26. In the plugged-together state, the first pressure chamber D1 and the first receiving pressure chamber $E_1$ form a common volume for the transmission of fluid pressure. Likewise, the second pressure chamber $D_2$ and the second receiving pressure chamber $E_2$ form a common volume in which leakage fluid collects and is discharged to the environment or is measured in a leakage monitor. The third pressure chamber $D_3$ and the third pressure chamber $E_3$ also form a common volume in which fluid pressure can be transmitted. The second coupling part 4 is shown broken up in the second plug area $A_2$ on the right-hand side in FIG. 5, thus providing a clear view of the sliding contacts 71 and electrical conductor 72, which are fixed to the second receiving part 24. The sliding contacts 72 on the second receiving part 24 extend advantageously along the inner wall of the second receiving part 24 and form an arc angle of approx. 180° around the second axis S. Corresponding sliding contacts are provided on the second coupling part 4, which are each arranged in a certain position parallel to the first axis R and each come into contact with one sliding contact 72 on the second receiving part 24. It is understood that such sliding contacts 72 with electrical conductors 71 can also be arranged on the first and third receiving part 22, 26. The outer diameter of the first coupling part 2 is advantageously smaller than the outer diameter of the first receiving part 22, because in this way the coupling plug can be inserted into the smallest possible recess n of a kingpin 8.

REFERENCE SIGNS

| | |
|---|---|
| 2 | first coupling part |
| 4 | second coupling part |
| 5 | seal |
| 6 | third coupling part |
| 7 | electrical system |
| 8 | kingpin |
| 9 | light signal transmission system |
| 10 | coupling plug |
| 20 | coupling receptacle |
| 22 | first receiving part |
| 24 | second receiving part |
| 26 | third receiving part |
| 30 | leakage monitor |
| 42 | protective element |
| 71 | sliding contact |
| 72 | electrical conductor |
| 92 | light signal transmitter/receiver |
| 94 | light signal transmitter/receiver |
| $A_1$ | first plug area |
| $A_2$ | second plug area |
| $B_1$ | first receiving area |

-continued

| | |
|---|---|
| B₂ | second receiving area |
| D₁ | first pressure chamber |
| D₂ | second pressure chamber |
| D₃ | third pressure chamber |
| E₁ | first receiving pressure chamber |
| E₂ | second receiving pressure chamber |
| E₃ | third receiving pressure chamber |
| H | trailer |
| R | first axis |
| S | second axis |
| Z | towing vehicle |

The invention claimed is:

1. A coupling plug for a kingpin, comprising:
a first coupling part;
a second coupling part; and
a third coupling part;
wherein the second coupling part is arranged at least partially within the first coupling part and the third coupling part is arranged at least partially within the second coupling part;
wherein the first, second and third coupling parts extend coaxially to a first axis in an area of overlap of the first, second and third coupling parts;
wherein a first pressure chamber is formed between the first coupling part and the second coupling part;
wherein a second pressure chamber is formed between the second coupling part and the third coupling part;
wherein the third coupling part is hollow and forms a third pressure chamber;
wherein in a first plug area of the coupling plug at least the first and third coupling parts are configured for fluid-tight connection to a fluid pressure system of a trailer;
wherein in a second plug area of the coupling plug at least the first and the third coupling part are configured for connection to a coupling receptacle; and
wherein the second pressure chamber in an area of the first plug area is closed in a fluid-tight manner or opens into the environment or is connected to a leakage monitor.

2. The coupling plug according to claim 1, wherein the first coupling part is secured against rotation about the first axis relative to the trailer.

3. The coupling plug according to claim 1, wherein at least one of the first, second and third coupling parts has a sliding contact of an electrical system in the area of the second plug area.

4. The coupling plug according to claim 3, wherein the sliding contact is connected to an electrical conductor which is insulated from the respective first, second and/or third coupling part.

5. The coupling plug according to claim 4, wherein a sliding contact projects out of the coupling plug in the first plug area.

6. The coupling plug according to claim 3, wherein the sliding contact extends with an arc angle of at least 180° about the first axis on an inner or outer wall of the respective first, second and/or third coupling part.

7. The coupling plug according claim 3, wherein the sliding contact is one of a plurality of sliding contacts provided on one or a plurality of the first, second and third coupling parts, and wherein each of the sliding contacts of the plurality of sliding contacts is connected to an electrical conductor.

8. The coupling plug according to claim 3, wherein the sliding contacts is arranged and fixed on the second coupling part only.

9. The coupling plug according to claim 3, wherein at least one of the first, second and/or third coupling parts comprises an electrically non-conductive material, wherein the sliding contact is applied to this at least one first, second and/or third coupling part.

10. The coupling plug according to claim 9, wherein at least two adjacent coupling parts of the first, second and/or third coupling parts comprise an electrically non-conductive material, and wherein the sliding contact is applied to each of these first, second and/or third coupling parts.

11. The coupling plug according to claim 1, wherein the first coupling part is materially connected to or constructed in one piece with a kingpin.

12. The coupling plug according to claim 1, wherein the second pressure chamber opens into the environment.

13. The coupling plug of claim 12, wherein a protective element is provided at an outlet into the environment of the second pressure chamber.

14. The coupling plug according to claim 1, further comprising:
a light signal transmission system, wherein a first light signal transmitter and/or receiver is fixed to at least one of the first, second and/or third coupling parts, which is configured to communicate without contact with a second light signal transmitter and/or receiver on a coupling receptacle.

15. A coupling receptacle for a fifth wheel coupling, comprising:
a first receiving part;
a second receiving part; and
a third receiving part;
wherein the second receiving part is arranged in regions within the first receiving part and the third receiving part is arranged in regions within the second receiving part;
wherein the first, second and third receiving parts extend coaxially to a second axis in the area of overlap of the first, second and/or third receiving part;
wherein a first receiving pressure chamber is formed between the first receiving part and the second receiving part;
wherein a second receiving pressure chamber is formed between the second receiving part and the third receiving part;
wherein the third receiving part is hollow and forms a third receiving pressure chamber;
wherein in a first receiving section of the coupling receptacle at least the first and third receiving parts are configured for fluid-tight connection to a fluid pressure system of a towing vehicle;
wherein in a second receiving section of the coupling receptacle at least the first and third receiving parts are configured for connection to a coupling plug; and
wherein the second receiving pressure chamber in an area of the first receiving section is closed in a fluid-tight manner or opens into the environment or is connected to a leakage monitor; and
wherein the second receiving pressure chamber is connected to a leakage monitoring system.

16. A coupling system, comprising:
a coupling plug for a kingpin, comprising:
a first coupling part;
a second coupling part; and
a third coupling part;

wherein the second coupling part is arranged at least partially within the first coupling part, and the third coupling part is arranged at least partially within the second coupling part;

wherein the first, second and third coupling parts extend coaxially to a first axis in an area of overlap of the first, second and third coupling parts;

wherein a first pressure chamber is formed between the first coupling part and the second coupling part;

wherein a second pressure chamber is formed between the second coupling part and the third coupling part;

wherein the third coupling part is hollow and forms a third pressure chamber;

wherein in a first plug area of the coupling plug at least the first and third coupling parts are configured for fluid-tight connection to a fluid pressure system of a trailer;

wherein in a second plug area of the coupling plug at least the first and the third coupling part are configured for connection to a coupling receptacle; and wherein the second pressure chamber in an area of the first plug area is closed in a fluid-tight manner or opens into the environment or is connected to a leakage monitor; and a coupling receptacle for a fifth wheel coupling, comprising:

a first receiving part;

a second receiving part; and a third receiving part;

wherein the second receiving part is arranged in regions within the first receiving part and the third receiving part is arranged in regions within the second receiving part;

wherein the first, second and third receiving parts extend coaxially to a second axis in the area of overlap of the first, second and/or third receiving part;

wherein a first receiving pressure chamber is formed between the first receiving part and the second receiving part;

wherein a second receiving pressure chamber is formed between the second receiving part and the third receiving part;

wherein the third receiving part is hollow and forms a third receiving pressure chamber;

wherein in a first receiving section of the coupling receptacle at least the first and third receiving parts are configured for fluid-tight connection to a fluid pressure system of a towing vehicle;

wherein in a second receiving section of the coupling receptacle at least the first and third receiving parts are configured for connection to a coupling plug; and wherein the second receiving pressure chamber in an area of the first receiving section is closed in a fluid-tight manner or opens into the environment or is connected to a leakage monitor;

wherein the coupling plug and the coupling receptacle engage with one another such that the first coupling part makes fluid-tight contact with the first receiving part, the second coupling part makes fluid-tight contact with the second receiving part and the third coupling part makes fluid-tight contact with the third receiving part; and wherein the contact surfaces of the first, second and/or third coupling parts and the first, second and/or receiving parts are substantially rotationally symmetrical about the first axis.

* * * * *